United States Patent
Huang-Fu et al.

(10) Patent No.: US 11,496,944 B2
(45) Date of Patent: *Nov. 8, 2022

(54) ENHANCED UE ROUTE SELECTION POLICY (URSP) RULES EVALUATION

(71) Applicant: MEDIATEK INC., Hsin-Chu (TW)

(72) Inventors: Chien-Chun Huang-Fu, Hsin-Chu (TW); Chia-Lin Lai, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/930,040

(22) Filed: Jul. 15, 2020

(65) Prior Publication Data
US 2021/0051562 A1    Feb. 18, 2021

Related U.S. Application Data

(60) Provisional application No. 62/888,173, filed on Aug. 16, 2019.

(51) Int. Cl.
*H04W 40/02* (2009.01)
*H04W 76/10* (2018.01)
*H04L 45/30* (2022.01)
*H04L 45/302* (2022.01)

(52) U.S. Cl.
CPC .......... *H04W 40/02* (2013.01); *H04L 45/306* (2013.01); *H04W 76/10* (2018.02)

(58) Field of Classification Search
CPC ..... H04W 76/12; H04W 76/18; H04W 76/11; H04W 76/10; H04W 40/18; H04W 40/02; H04W 48/18; H04L 45/306
See application file for complete search history.

(56) References Cited

U.S. PATENT DOCUMENTS

2020/0053622 A1* 2/2020 Huang-Fu ............. H04W 8/183
2020/0404567 A1* 12/2020 Tang ....................... H04W 8/18
2021/0184965 A1   6/2021 Wang .................... H04L 45/306

FOREIGN PATENT DOCUMENTS

CN    109286567 A    11/2018

OTHER PUBLICATIONS

China IPO, office action for the Chinese patent application 202010807021.X (no English translation is available), dated Jul. 1, 2022 (6 pages).

* cited by examiner

*Primary Examiner* — Jianye Wu
(74) *Attorney, Agent, or Firm* — Imperium Patent Works; Zheng Jin

(57) ABSTRACT

A method for evaluation of UE route selection policy (URSP) rules is proposed. URSP is used by a UE to determine if a detected application can be associated to an established PDU session, can be offloaded to non-3GPP access outside a PDU session, or can trigger the establishment of a new PDU session. The UE first finds a non-default URSP rule with a matching traffic descriptor to the application. Then, the UE selects a route selection descriptor including a preferred access type from a list of RSDs of the non-default URSP rule. After that, the UE matches or establishes a Protocol Data Unit (PDU) session for the application by ignoring the preferred access type or using the preferred access type.

20 Claims, 5 Drawing Sheets

| PRECEDENCE VALUE | THE PRECEDENCE OF THE URSP RULE AMONG ALL EXISTING URSP RULES |
|---|---|
| TRAFFIC DESCRIPTOR | MATCH ALL TRAFFIC DESCRIPTOR |
| | APPLIATION IDENTIFIERS<br>IP DESCRIPTOR(S)<br>DOMAIN DESCRIPTORS<br>NON-IP DESCRIPTORS<br>DNN(S)<br>CONNECTION CAPABILITIES |
| ROUTE SELECTION DESCRIPTORS | PRECEDENCE VALUE<br>    SSC MODE<br>    S-NSSAI(S)<br>    DNN(S)<br>    PDU SESSION TYPE<br>    NON-SEAMLESS NON-3GPP OFFLOAD INDICATION<br>    PREFERRED ACCESS TYPE<br>    MULTI-ACCESS PREFERENCE<br>    ROUTE SELECTION VALIDATION CRITERIA |

FIG. 3

ENHANCED UE ROUTE SELECTION POLICY (URSP) RULES EVALUATION

CROSS REFERENCE TO RELATED APPLICATIONS

This application claims priority under 35 U.S.C. § 119 from U.S. Provisional Application No. 62/888,173, entitled "Preferred Access Type in URSP", filed on Aug. 16, 2019, the subject matter of which is incorporated herein by reference.

TECHNICAL FIELD

The disclosed embodiments relate generally to wireless communication, and, more particularly, to method for enhanced UE route selection policy (URSP) rules evaluation in 5G new radio (NR) systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an Evolved Universal Terrestrial Radio Access Network (E-UTRAN) includes a plurality of evolved Node-Bs (eNodeBs or eNBs) communicating with a plurality of mobile stations, referred to as User Equipments (UEs). The $3^{rd}$ Generation Partner Project (3GPP) network normally includes a hybrid of 2G/3G/4G systems. The Next Generation Mobile Network (NGMN) board, has decided to focus the future NGMN activities on defining the end-to-end requirements for 5G New Radio (NR) systems (5GS).

The UE policies for 5GS include UE Route Selection Policy (URSP) and Access Network Discovery and Selection Policy (ANDSP). The UE policies can be delivered from a Policy Control Function (PCF) to UE. PCF takes care of network policies to manage network behavior. PCF gets the subscription information from Unified Data Management (UDM). PCF interfaces to both Access and Mobility Function (AMF) to manage the mobility context and Session Management Function (SMF) to manage the session contexts. PCF also plays a crucial role in providing a schema for network slicing and roaming. PCF triggers the URSP which enables the UE to determine how a certain application should be handled in the context of an existing or new Protocol Data Unit (PDU) session. The UE policies can also be pre-configured in UE. The pre-configured policy should be applied by UE only when UE has not received the same type of policy from the PCF.

A PDU session defines the association between the UE and the data network that provides a PDU connectivity service. Each PDU session is identified by a PDU session ID, and includes one or more quality of service (QoS) flows and QoS rules. When the upper layers request information of the PDU session via which to send a PDU of an application, UE should evaluate the URSP rules. During the non-default URSP rules evaluation, the UE finds the traffic descriptor in a non-default URSP rule matching the application information, and an established PDU session matching at least one of the route selection descriptors of the URSP rule. If there is no suitable existing PDU session, the UE should establish a PDU session for one the route selection descriptors.

In particular, a route selection descriptor may include an access type preference which indicates a preferred access type and/or a multi access preference for matching or establishing a PDU session for the application. However, the UE behavior is not defined regarding how to apply the access type preference(s) when matching or establishing a PDU session.

A solution is sought.

SUMMARY

A method for evaluation of UE Route Selection Policy (URSP) rules is proposed. URSP is used by a UE to determine if a detected application can be associated to an established Protocol Data Unit (PDU) session, can be offloaded to non-3GPP access outside a PDU session, or can trigger the establishment of a new PDU session. The UE first finds a non-default URSP rule with a matching traffic descriptor to the application. When the UE fails to find existing PDU session or setup new PDU session with any of the route selection descriptors of the non-default URSP rule, the UE moves to another non-default URSP rule, if any, and try the matching. If all non-default URSP rules cannot be matched with the application, then the UE tries the default URSP rule, which includes a match-all traffic descriptor.

In one embodiment, a UE starts an application in a mobile communication network. The UE selects a non-default URSP rule from one or more configured non-default URSP rules in response to a traffic descriptor of the non-default URSP rule matching the application information. The UE selects a Route selection descriptor from a list of route selection descriptors of the non-default URSP rule, wherein the route selection descriptor comprises a preferred access type and/or a multi access preference. The UE matches or establishes a PDU session for the application by ignoring the preferred access type and/or a multi access preference, or by using the preferred access type and/or a multi access preference. In one example, the matching of a PDU session for the application involves finding an existing PDU session that matches the route selection descriptor (i.e., matches each component of a respective component type of the route selection descriptor), except the preferred access type and/or a multi access preference. In another example, the establishing of a PDU session for the application involves establishing a new PDU session based on the preferred access type and/or a multi access preference.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 illustrates the content of a URSP rule as defined in 3GPP specification.

DETAILED DESCRIPTION

Reference will now be made in detail to some embodiments of the invention, examples of which are illustrated in the accompanying drawings.

Figure 1:
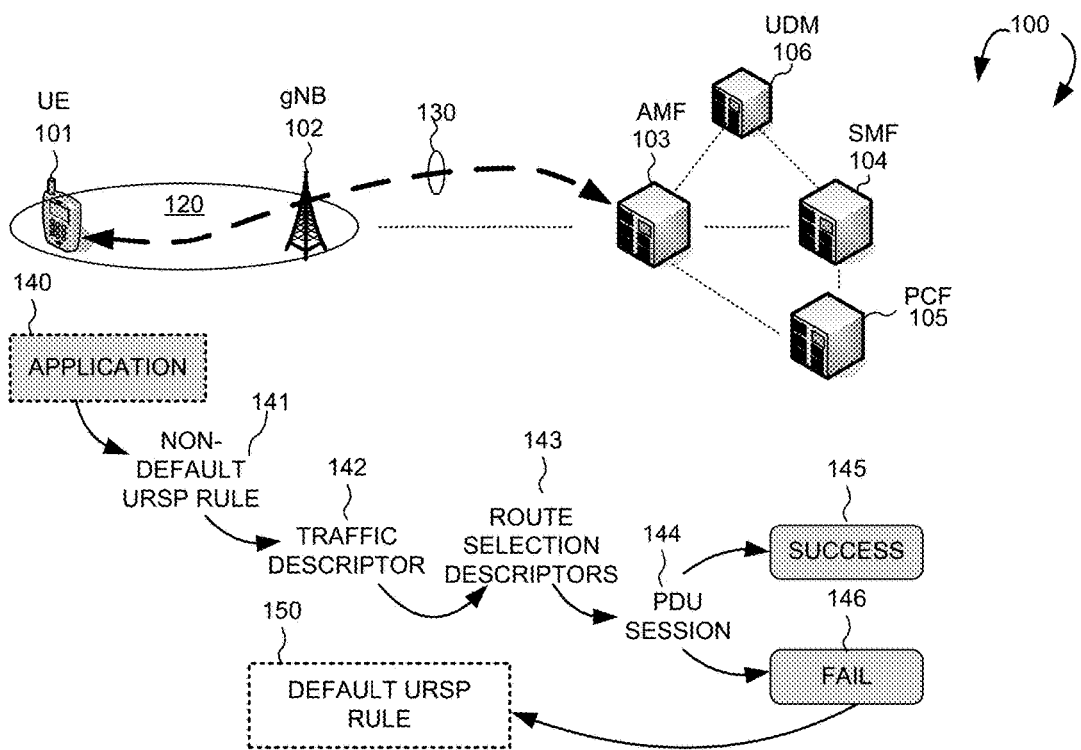
FIG. 1 illustrates an exemplary 5G network 100 supporting enhanced User Equipment (UE) Route Selection Policy (URSP) rules evaluation in accordance with one novel aspect.

FIG. 1 illustrates an exemplary 5G network 100 supporting enhanced User Equipment (UE) Route Selection Policy (URSP) rules evaluation in accordance with one novel aspect. 5G New Radio (NR) network 100 comprises a UE 101, a base station gNB 102, an Access and Mobility Management Function (AMF) 103, a Session Management Function (SMF) 104, a Policy Control Function (PCF) 105, and a Unified Data Management (UDM) 106. In the example of FIG. 1, UE 101 and its serving base station gNB 102 belong to part of a Radio Access Network (RAN) 120. In Access Stratum (AS) layer, RAN 120 provides radio access for UE 101 via a Radio Access Technology (RAT) (e.g., 5G NR). In Non-Access Stratum (NAS) layer, AMF 103 communicates with gNB 102 and SMF 104 for access and mobility management of wireless access devices in 5G network 100. UE 101 may be equipped with a Radio Frequency (RF) transceiver or multiple RF transceivers for different application services via different RATs/CNs. UE 101 may be a smart phone, a wearable device, an Internet of Things (IoT) device, and a tablet, etc.

5G networks are Packet-Switched (PS) Internet Protocol (IP) networks. This means that the networks deliver all data traffic in IP packets, and provide users with Always-On IP Connectivity. When UE joins a 5G network, a Packet Data Network (PDN) address (i.e., the one that can be used on the PDN) is assigned to the UE for its connection to the PDN. In 4G, Evolved Packet System (EPS) has defined a Default EPS Bearer to provide the IP Connectivity that is Always-On. In 5G, a Protocol Data Unit (PDU) session establishment procedure is a parallel procedure of a PDN connection procedure in 4G. A PDU session (e.g., 130) defines the association between the UE and the data network that provides a PDU connectivity service. Each PDU session is identified by a PDU session ID, and may include multiple QoS flows and QoS rules.

The UE policies for 5GS include UE Route Selection Policy (URSP) and Access Network Discovery and Selection Policy (ANDSP). The UE policies can be delivered form Policy Control Function (PCF) to UE. PCF takes care of network policies to manage network behavior. PCF gets the subscription information from Unified Data Management (UDM). PCF interfaces to both Access and Mobility Function (AMF) to manage the mobility context and Session Management Function (SMF) to manage the session contexts. PCF also plays a crucial role in providing a scheme for network slicing and roaming. PCF triggers the URSP which enables the UE to determine how a certain application should be handled in the context of an existing or new PDU session. The UE policies can also be pre-configured in UE. The pre-configured policy should be applied by UE only when UE has not received the same type of policy from the PCF.

When UE 101 starts application 140, UE upper layers trigger URSP rules evaluation. Specifically, UE 101 evaluates the URSP rules, except the default URSP rule, with a traffic descriptor matching the application information in increasing order of their precedence values. If UE 101 finds a non-default URSP rule (141) with a traffic descriptor (142) matching the application information, and an established PDU session matching at least one of the route selection descriptors (143) of the non-default URSP rule, UE 101 then provides information on the PDU session that matches the route selection descriptor of the lowest precedence value to the upper layers. Otherwise UE 101 selects a route selection descriptor with the next smallest precedence value which has not been evaluated.

If no non-default matching URSP rule can be found and if UE local configuration for the application is available, UE 101 should perform the association of the application to a PDU session accordingly. If no matching PDU session exists, the UE NAS layer should attempt to establish a PDU session 144 using UE local configuration. If the PDU session establishment is successful (145), the UE NAS layer should provide information of the successfully established PDU session to the upper layers. Otherwise, if no non-default matching URSP rule can be found and if either UE local configuration for the application is not available or the PDU session establishment based on UE local configuration for the application fails (146), UE 101 should perform the association of the application to a PDU session or to non-seamless non-3GPP offload according to the default URSP rule with the "match-all" traffic descriptor (150). If the association is unsuccessful, UE 101 informs the upper layers.

In particular, a route selection descriptor may include a preferred access type and/or a multi access preference for indicating the access type preference(s) for matching or establishing a PDU session for the application. In one example, the matching of a PDU session for the application involves finding an existing PDU session that matches all components (i.e., parameters) of the route selection descriptor, except the preferred access type and/or a multi access preference (i.e., the preferred access type and/or a multi access preference is ignored when matching a PDU session). In another example, the establishing of a PDU session for the application involves establishing a new PDU session based on the preferred access type and/or a multi access preference (i.e., the preferred access type and/or a multi access preference is used when establishing a PDU session).

Figure 2:
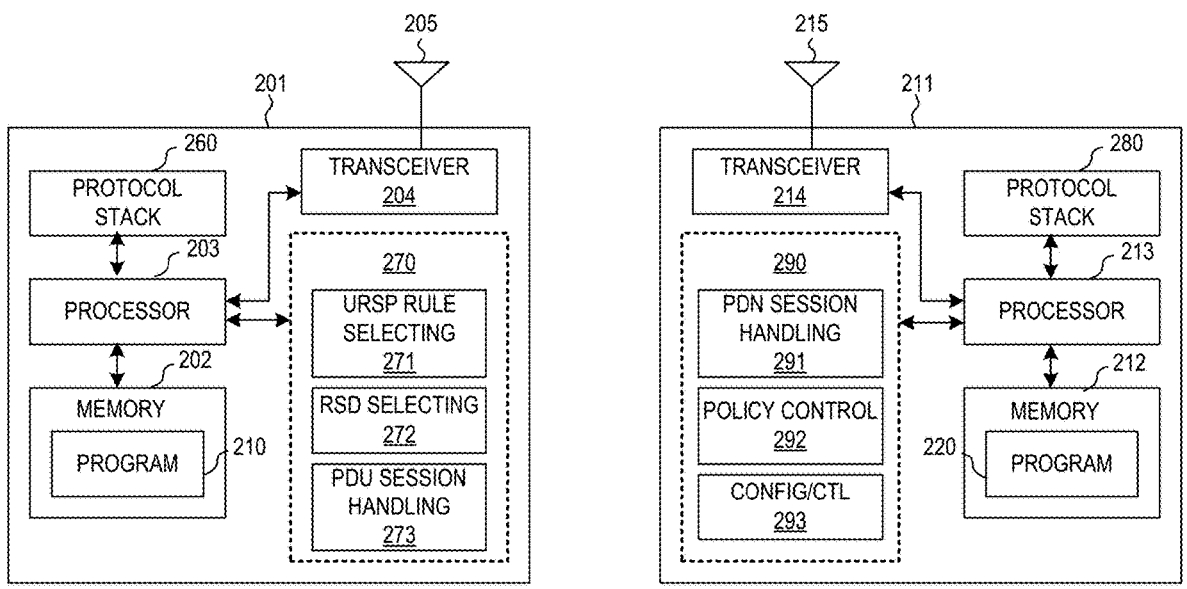
FIG. 2 illustrates simplified block diagrams of wireless devices, e.g., a UE 201 and network entity 211 in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. UE 201 has memory 202, a processor 203, and Radio Frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a Digital Signal Processor (DSP), a plurality of micro-processors, one or more micro-processor associated with a DSP core, a controller, a microcontroller, Application Specific Integrated Circuits (ASICs), File Programmable Gate Array (FPGA) circuits, and other type of Integrated Circuits (ICs), and/or state machines. A processor in associated with software may be used to implement and configure features of UE 201.

UE 201 also includes a set of functional modules and control circuits to carry out functional tasks of UE 201. Protocol stacks 260 may include application layer to manage different applications, Non-Access-Stratum (NAS) layer to communicate with an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 may include URSP rule selecting circuit 271, route selection descriptor (RSD) selecting circuit 272, and PDU session handling circuit 273 for performing URSP rules evaluation. Specifically, URSP rule selecting circuit 271 selects a non-default URSP rule from one or more configured non-default URSP rules when finding a traffic descriptor of the non-default URSP rule matching the application information. Route selection descriptor selecting circuit 272 selects a route selection descriptor from a list of route selection descriptors of the selected non-default URSP rule, wherein the route selection descriptor comprises a preferred access type and/or a multi access preference. PDU session handling circuit 273 matches an existing PDU session for the application by ignoring the preferred access type and/or a multi access preference, or establishes a new PDU session by using the preferred access type and/or a multi access preference. In addition, PDU session handling circuit 273 may perform PDU session establishment and modification procedures with the network. Although not shown, system modules and circuits 270 may also include a config and control circuit that handles configuration and control parameters for mobility management and session management.

Similarly, network entity 211 has an antenna 215, which transmits and receives radio signals. An RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuit 290. PDU session handling circuit 231 handles PDU session establishment and modification procedures. Policy control module 232 that configures policy rules for UE. Configuration and control circuit 233 provides different parameters to configure and control UE of related functionalities including mobility management and session management.

FIG. 3 illustrates the content of a URSP rule as defined in 3GPP specification. URSP is defined as a set of one or more URSP rules. As depicted by Table 300, each URSP rule is composed of: 1) a precedence value of the URSP rule identifying the precedence of the URSP rule among all the existing URSP rules; 2) a traffic descriptor; and 3) one or more route selection descriptors. The traffic descriptor includes either 1) a match-all traffic descriptor; or 2) at least one of the following components: A) one or more application identifiers; B) one or more IP descriptors, i.e., IP 3 tuple including the destination IP address, the destination port number, and the protocol used above the IP; C) one or more domain descriptors, i.e., destination FQDN(s); D) one or more non-IP descriptors, i.e., destination information of non-IP traffic; E) one or more DNNs; F) one or more connection capabilities. Each route selection descriptor includes a precedence value of the route selection descriptor and optionally, one or more of the followings: A) SSC mode; B) one or more S-NSSAIs; C) one or more DNNs; D) one PDU session type; E) a non-seamless non-3GPP offload indication; F) preferred access type; G) multi-access preference; H) Route Selection Validation Criteria (RSVC). Only one URSP rule in the URSP can be a default URSP rule and the default URSP rule should contain a match-all traffic descriptor. If a default URSP rule and one or more non-default URSP rules are included in the URSP, any non-default URSP rule should have lower precedence value (i.e., higher priority) than the default URSP rule.

In another embodiment, a new route selection descriptor component may be introduced to indicate whether the preferred access type is a strict requirement or not. For example, an "access type preference enforcement" parameter may be defined to indicate whether the access type preference should be enforced. Alternatively, a new indicator may be included in the preferred access type to indicate whether the preferred access type is a strict requirement or not. For example, a "required access type" parameter may be defined to indicate the preferred access type. Alternatively, a new RSVC component (e.g., UE registration) may be introduced to indicate the criteria related to the UE's registration status (e.g., 3GPP, or non-3GPP, or both), and the preferred access type is based on this new RSVC component. For example, when the UE is registered over 3GPP access as defined by the criteria, the UE may check the route selection descriptor where the preferred access type is 3GPP access.

Figure 4:
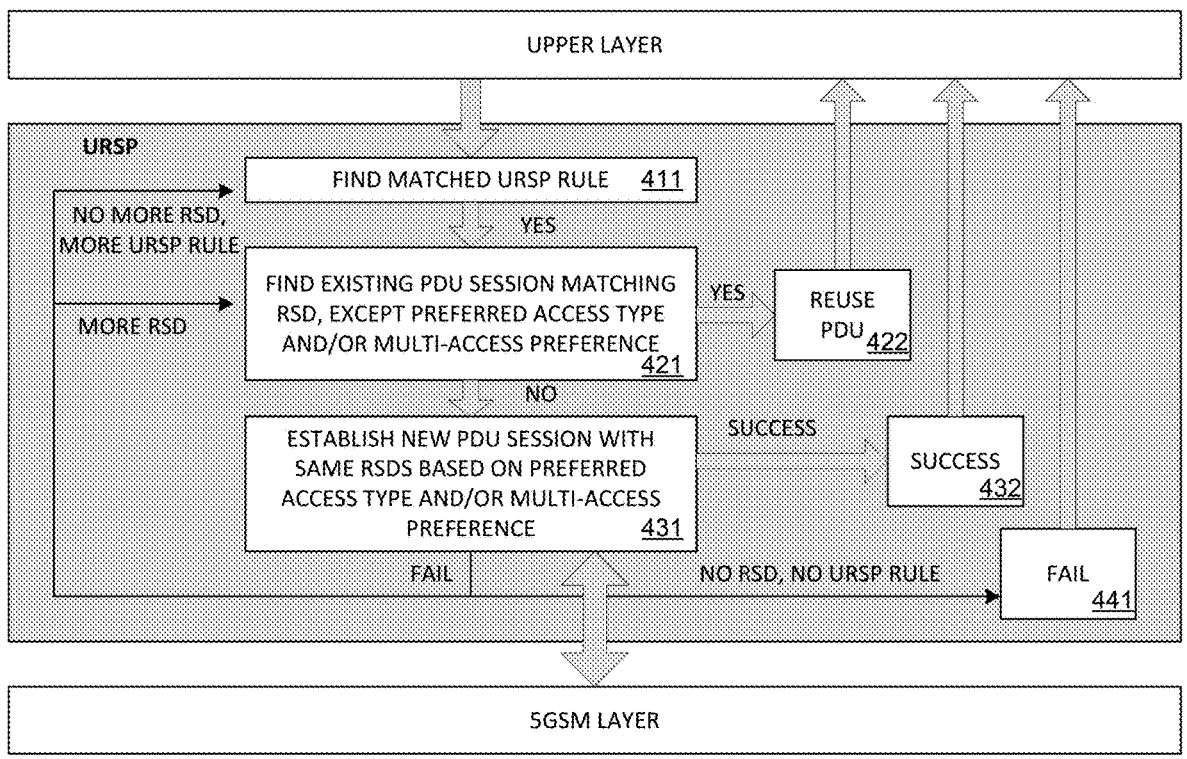
FIG. 4 illustrates different layers inside a UE for supporting enhanced URSP rules evaluation in accordance with one novel aspect of the present invention.

FIG. 4 illustrates different layers inside a UE for supporting enhanced URSP rules evaluation in accordance with one novel aspect of the present invention. URSP is used by the UE to determine if a detected application can be associated to an established PDU session, can be offloaded to non-3GPP access outside a PDU session, or can trigger the establishment of a new PDU session. A URSP rule includes one traffic descriptor that specifies the matching criteria and one or more route selection descriptors. Each route selection descriptor may include one or more of the following components: SSC mode selection policy to associated the matching application with SSC mode, network slice selection policy to associate the matching application with S-NSSAI, DNN selection policy to associated the matching application with DNN, PDU session type policy to associated the matching application with a PDU session type, non-seamless offload policy to determine that the matching application should be non-seamlessly offloaded to non-3GPP access (i.e., out of a PDU session), and access type preference indicating a preferred access (3GPP or non-3GPP or multi-access) when UE needs to establish a PDU session for the matching application.

In the embodiment of FIG. 4, to determine association between an application and a PDU session or non-seamless non-3GPP offload, UE upper layers proceed with URSP rules evaluation. In step 411, in increasing order of their precedence values, UE evaluates the URSP rules, except the default URSP rule, with a traffic descriptor matching the application information. For example, an application identifier included in the traffic descriptor matches with an application ID of the application. Note that if the traffic descriptor contains more than one component, then, all of them (i.e., each component of a respective component type of the traffic descriptor) need to be matched with the application information.

If the UE finds the traffic descriptor in a non-default URSP rule matching the application information, in step 421, UE tries to find one or more existing PDU sessions that match at least one of the route selection descriptors of the URSP rule except the preferred access type and/or the multi-access preference, if any. If the answer is yes, then UE reuses the existing PDU session in step 422 and provides information on the PDU session that matches the route selection descriptor of the lowest precedence value to the upper layers. If the answer is no, then UE goes to step 431 and the UE 5GSM layer tries to establish a new PDU session with the same route selection descriptors of the evaluating URSP rule based on the preferred access type and/or the multi-access preference into use, if any. If the PDU session is successfully established, then UE goes to step 432 and provides information on the newly established PDU session. Specifically, the UE NAS layer indicates the attributes of the established PDU session (e.g., PDU session ID, SSC mode, S-NSSAI, DNN, PDU session type, access type, PDU address) to the URSP handling layer, and provides information (e.g., PDU address) of the established PDU session to the upper layers.

Otherwise, if step 431 fails, and if there are more route selection descriptors which have not been evaluated, UE selects a route descriptor with the next smallest precedence value which has not been evaluated and goes to step 421. If no more route selection descriptors for the URSP rule, then UE goes back to step 411 and tries to find a next non-default URSP rule having the next smallest precedence value, and with a traffic descriptor that matches the application information. UE continues with step 421 and step 431 to find the suitable PDU session for the next non-default URSP rule. If step 431 fails for all non-default URSP rules, then UE informs the upper layers of the failure (441). If all non-default URSP rules cannot be matched with the application, then the UE tries the default URSP rule, which includes a match-all traffic descriptor.

Figure 5:
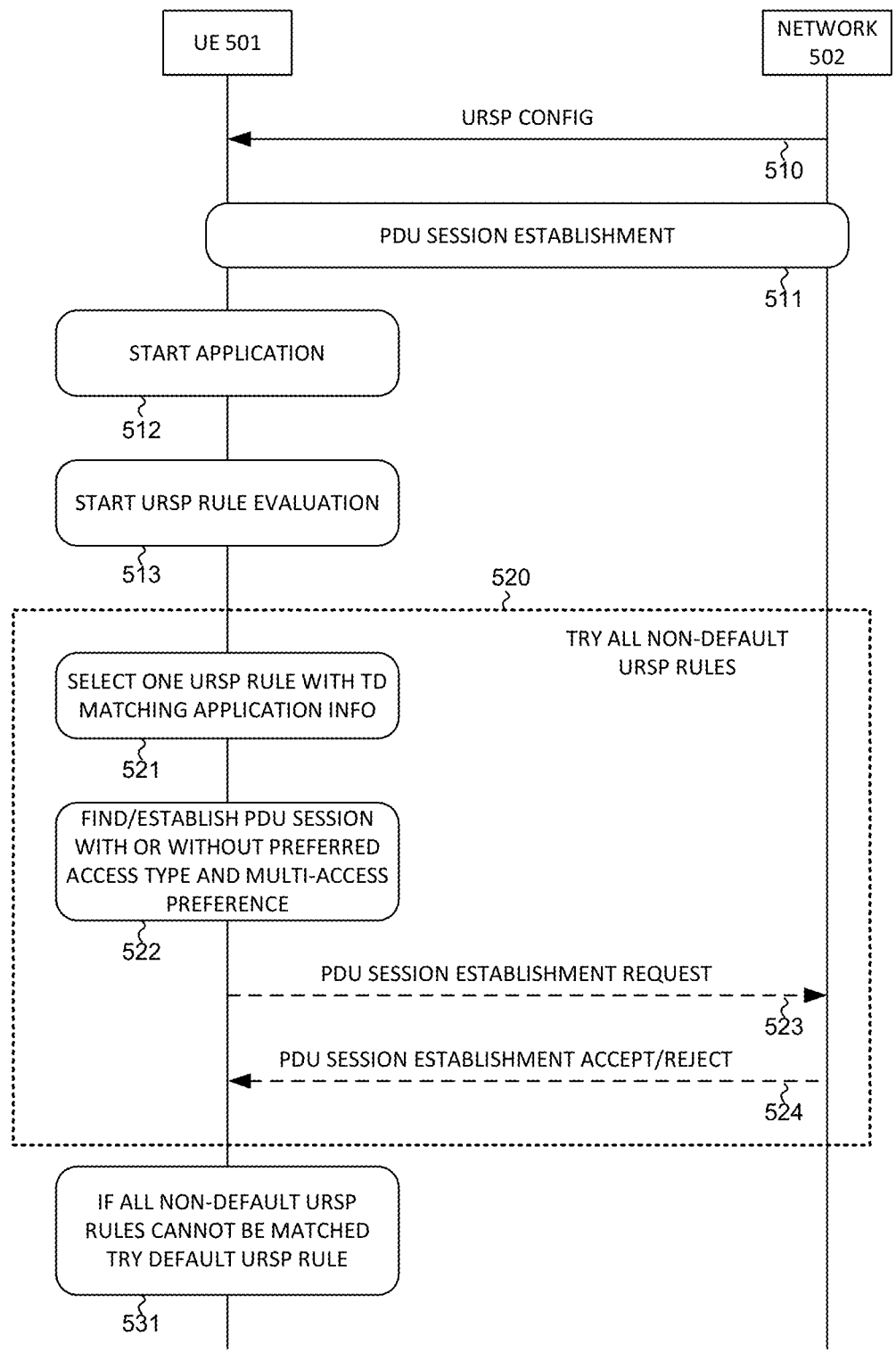
FIG. 5 illustrates a sequence flow between a UE and the network for URSP rules evaluation in accordance with one novel aspect of the present invention.

FIG. 5 illustrates a sequence flow between a UE and the network for URSP rules evaluation in accordance with one novel aspect of the present invention. In step 510, network 502 (via PCF) provides URSP configuration or update to UE 501. URSP may include a set of URSP rules, including one default URSP rule. In step 511, UE 501 and network 502 establish one or more PDU sessions, each PDU session has information including Serving NSSAI, DNN, and PDU session ID. In step 512, UE 501 starts an application. In order to determine association between the application and a PDU session or non-seamless non-3GPP offload, UE upper layers proceed with URSP rule evaluation in step 513. In step 520, UE 501 tries all non-default URSP rules in an increasing order of the precedence values of the URSP rules. Specifically, in step 521, UE 501 selects one non-default URSP rule with a traffic descriptor matching the application information, and then, in step 522, UE 501 either finds an existing PDU session, or establishes a new PDU session, which matches at least one of the route selection descriptors of the selected URSP rule except or considering the preferred access type and the multi-access preference. If no matching PDU sessions exists, the UE NAS layer may then attempt to establish a new PDU session. For example, in step 522, UE 501 sends a PDU session establishment request to the network. In step 523, the network sends a PDU session establishment accept to UE 501 and a new PDU session is established successfully for the application. Otherwise, the network sends a PDU session establishment reject to UE 501 and the PDU session is not established. After step 520, if all non-default URSP rules cannot be matched with the application, then in step 531, UE 501 tries the default URSP rule, which includes a match-all traffic descriptor. If the association is still unsuccessful, then UE 501 informs the upper layers of the failure.

Figure 6:
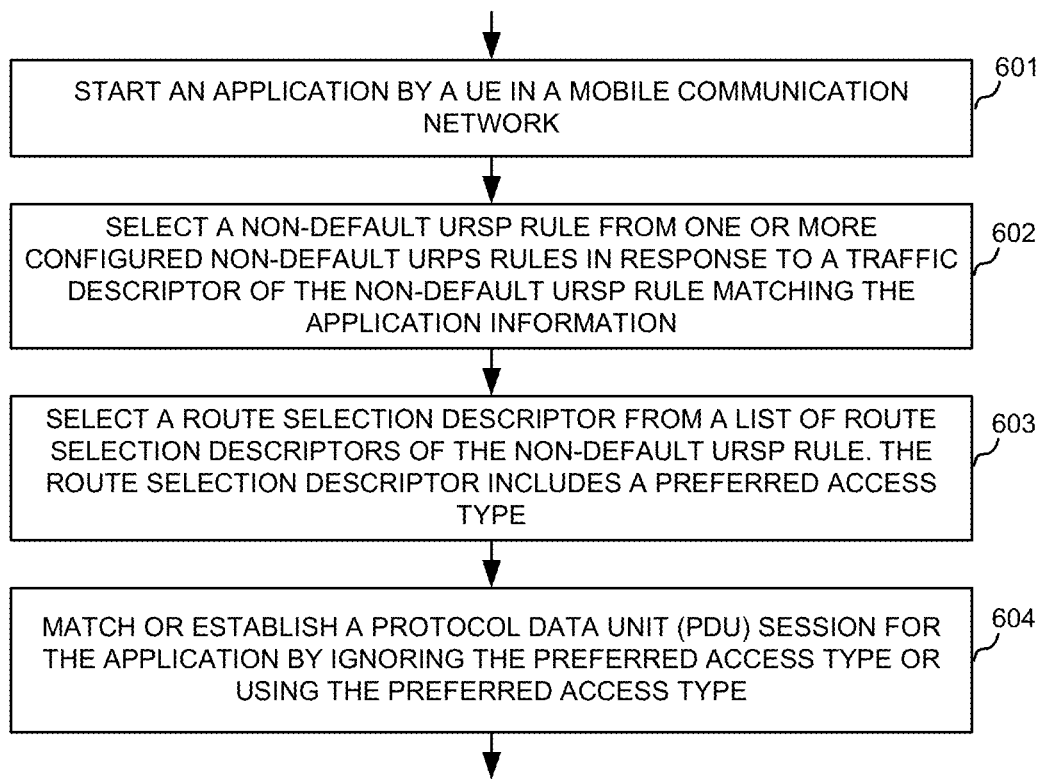
FIG. 6 is a flow chart of a method for evaluation of URSP rules in accordance with one novel aspect of the present invention.

FIG. 6 is a flow chart of a method for evaluation of URSP rules in accordance with one novel aspect of the present invention. In step 601, a UE starts an application in a mobile communication network. In step 602, the UE selects a non-default URSP rule from one or more configured non-default URSP rules in response to a traffic descriptor of the non-default URSP rule matching the application information. In step 603, the UE selects a route selection descriptor from a list of route selection descriptors of the non-default URSP rule, wherein the route selection descriptor includes a preferred access type. In step 604, the UE matches or establishes a PDU session for the application by ignoring the preferred access type or using the preferred access type. In one example, the matching of a PDU session for the application involves finding an existing PDU session that matches all components of the route selection descriptor, except the preferred access type. In another example, the establishing of a PDU session for the application involves establishing a new PDU session based on the preferred access type.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for evaluation of User Equipment (UE) Route Selection Policy (URSP) rules, comprising:
   (a) starting an application by a User Equipment (UE) in a mobile communication network;
   (b) selecting a non-default URSP rule from one or more configured non-default URSP rules in response to a traffic descriptor of the non-default URSP rule matching the application information;
   (c) selecting a route selection descriptor from a list of route selection descriptors of the non-default URSP rule, wherein the route selection descriptor comprises a preferred access type;
   (d) matching or establishing a Protocol Data Unit (PDU) session for the application by ignoring the preferred access type.

2. The method of claim 1, wherein the matching in (d) involves finding an existing PDU session that matches the route selection descriptor, except the preferred access type.

3. The method of claim 1, wherein the route selection descriptor further comprises a multi-access preference, and the matching in (d) involves finding an existing PDU session that matches the route selection descriptor, except the preferred access type and the multi-access preference.

4. The method of claim 1, wherein the establishing in (d) involves establishing a new PDU session based on the preferred access type.

5. The method of claim 1, wherein the route selection descriptor further comprises a multi-access preference, and the establishing in (d) involves establishing a new PDU session based on the preferred access type or the multi-access preference.

6. The method of claim 1, wherein the establishing in (d) is performed by using the preferred access type in response to the preferred access type indicating 3$^{rd}$ Generation Partner Project (3GPP) or non-3GPP, and the matching in (d) is performed by ignoring the preferred access type in response to the preferred access type indicating multi-access.

7. The method of claim 1, wherein the route selection descriptor further comprises information of whether the preferred access type is a strict requirement or not, and the matching or establishing in (d) is performed by using the preferred access type in response to the information indicating that the preferred access type is a strict requirement.

8. The method of claim 7, wherein the information is included in a new route selection descriptor component or is an indicator included in the preferred access type.

9. The method of claim 1, wherein the route selection descriptor further comprises a required access type, and the matching or establishing in (d) is performed by using the required access type in response to the route selection descriptor comprising the required access type.

10. The method of claim 1, wherein the route selection descriptor comprises a Route Selection Validation Criteria (RSVC) with a new component indicating a criteria related to a registration status of the UE, and the matching or establishing in (d) is performed by using the preferred access type in response to the registration status indicating that the UE is registered over the preferred access type.

11. A User Equipment (UE), comprising:
an application layer entity that starts an application in a mobile communication network, wherein the application triggers UE Route Selection Policy (URSP) rule matching for the application;
a URSP rule selecting circuit that selects a non-default URSP rule from one or more configured non-default URSP rules in response to a traffic descriptor of the non-default URSP rule matching the application information;
a route selection descriptor selecting circuit that selects a route selection descriptor from a list of route selection descriptors of the non-default URSP rule, wherein the route selection descriptor comprises a preferred access type; and
a Protocol Data Unit (PDU) session handling circuit that performs matching or establishing a PDU session for the application by ignoring the preferred access type.

12. The UE of claim 11, wherein the UE performs matching the PDU session for the application by finding an existing PDU session that matches the route selection descriptor, except the preferred access type.

13. The UE of claim 11, wherein the route selection descriptor further comprises a multi-access preference, and the UE performs matching the PDU session for the application by finding an existing PDU session that matches the route selection descriptor, except the preferred access type and the multi-access preference.

14. The UE of claim 11, wherein the UE performs establishing the PDU session for the application by establishing a new PDU session based on the preferred access type.

15. The UE of claim 11, wherein the route selection descriptor further comprises a multi-access preference, and the UE performs establishing the PDU session for the application by establishing a new PDU session based on the preferred access type or the multi-access preference.

16. The UE of claim 11, wherein the UE performs establishing the PDU session for the application by using the preferred access type in response to the preferred access type indicating 3$^{rd}$ Generation Partner Project (3GPP) or non-3GPP, and the UE performs matching the PDU session for the application by ignoring the preferred access type in response to the preferred access type indicating multi-access.

17. The UE of claim 11, wherein the route selection descriptor further comprises information of whether the preferred access type is a strict requirement or not, and the UE performs matching or establishing the PDU session for the application by using the preferred access type in response to the information indicating that the preferred access type is a strict requirement.

18. The UE of claim 17, wherein the information is included in a new route selection descriptor component or is an indicator included in the preferred access type.

19. The UE of claim 11, wherein the route selection descriptor further comprises a required access type, and the UE performs matching or establishing the PDU session for the application by using the required access type in response to the route selection descriptor comprising the required access type.

20. The UE of claim 11, wherein the route selection descriptor comprises a Route Selection Validation Criteria (RSVC) with a new component indicating a criteria related to a registration status of the UE, and the UE performs matching or establishing the PDU session for the application by using the preferred access type in response to the registration status indicating that the UE is registered over the preferred access type.

* * * * *